(12) United States Patent
Carle

(10) Patent No.: US 6,182,914 B1
(45) Date of Patent: Feb. 6, 2001

(54) METHOD AND DEVICE FOR PRE-MILLING A CONFECTIONERY MATERIAL

(75) Inventor: Giovanni Marco Carle, Milan (IT)

(73) Assignee: Carle & Montanari S.p.A, Milan (IT)

( * ) Notice: Under 35 U.S.C. 154(b), the term of this patent shall be extended for 0 days.

(21) Appl. No.: 09/298,873

(22) Filed: Apr. 26, 1999

(30) Foreign Application Priority Data

Apr. 30, 1998 (IT) .............................................. MI98A0943

(51) Int. Cl.[7] .................................................. B02C 25/00

(52) U.S. Cl. ............................ 241/30; 241/37; 241/101.3

(58) Field of Search ................................. 241/236, 37, 36, 241/30, 101.3

(56) References Cited

U.S. PATENT DOCUMENTS

| 4,519,304 | * | 5/1985 | Ripani ..................................... 241/37 |
| 4,603,815 | * | 8/1986 | Ripani et al. ........................... 241/37 |
| 4,635,861 | * | 1/1987 | Resch ..................................... 241/37 |
| 4,746,070 | * | 5/1988 | Kuster .................................... 241/37 |
| 5,379,950 | * | 1/1995 | Kuster .................................... 241/37 |

* cited by examiner

Primary Examiner—Mark Rosenbaum
(74) Attorney, Agent, or Firm—Kirschstein, et al.

(57) ABSTRACT

A desired consistency for particulate confectionery material is obtained by adjusting the spacing of a nip between two rotary milling cylinders in dependence upon a measured force exerted by the confectionery material on the cylinders during passage of the confectionery material through the nip.

20 Claims, 3 Drawing Sheets

METHOD AND DEVICE FOR PRE-MILLING A CONFECTIONERY MATERIAL

BACKGROUND OF THE INVENTION

The invention relates to a method and device for pre-milling confectionery material, such as chocolate.

As is known, confectionery material is conventionally pre-milled or pre-refined by a granulometric reduction of the particles forming the mass of said material, this operation being carried out between two rotary cylinders, of which a first cylinder can controllably swing with respect to a second cylinder which is supported at a fixed position.

Prior confectionery material making systems comprise pre-refining machines arranged between the mixers and the end refining machines.

Said pre-refining machines allow the reduction of the particle size of the confectionery material particles to values which would be suitable for the end refining machines. More specifically, said pre-refining machines, due to the reduced granulometry, provide a confectionery material mass having an even doughiness and, accordingly, an even consistency.

Actually, it is known that an undesired variation of the consistency of a pre-refined confectionery mass would alter a proper operation of the end refining machines.

At present, the variation of the consistency of the confectionery material being refined is evaluated by analyzing the quality of the already refined product. These consistency variations are compensated for by changing the milling distance or gap between the pre-refining machine cylinders. Thus, by either increasing or decreasing the granulometry of the confectionery mass, either a reduction or an increase of the area of the surface of the confectionery material particles is obtained, thereby differently distributing the fat present in said mass, and consequently either decreasing or increasing the consistency thereof.

At present, in order to carry out a reliable adjustment of the confectionery material consistency, skilled persons must evaluate the quality of the end product exiting the refining machines or devices, so as to establish a proper adjustment of the pre-refining machines.

Such an operating method, based on a visual control of the end product exiting the refining machine, has the drawback that it operates only after having refined a part of the confectionery material, and, accordingly, with a considerable delay.

SUMMARY OF THE INVENTION

Thus, the aim of the present invention is to overcome the above mentioned drawbacks of the prior art and, in particular, provide a confectionery material pre-milling method and device allowing to hold the confectionery material consistency constant.

According to the invention, this is achieved by a method for pre-milling a confectionery material, in which the particle size of the particles of said confectionery material is reduced between two cylinders, characterized in that said method comprises the steps of measuring the load or spreading-apart force between said two cylinders, comparing the measured spreading-apart force with a reference spreading-apart force value, to define a force variation, defining, based on said spreading-apart force variation, a desired distance between said cylinders allowing to adjust a mutual position of said cylinders by feedback controlling said position based on the measured distance between said cylinders.

In said pre-refining machines, the confectionery material is milled between milling cylinders having a preset milling distance or gap and respective mechanically set revolution speeds. Thus, to hold the confectionery material consistency constant, would mean to hold the load between said cylinders constant.

If the mixing device supplies the pre-refining machine with a confectionery material the consistency whereof changes depending, for example, on the fat contents of the product and on natural variations of the mixer metering device or the characteristics of the used starting materials, then a variation of the load or spreading-apart force produced by the confectionery material passing through said cylinders will be provided.

By the disclosed method, as the load between the cylinders changes, a new size or value of the milling gap for holding the confectionery material consistency unaltered will be set, and, based on this new gap or cylinder distance, the mutual positions of the laminating cylinders will be adjusted. Thus, by varying the milling gap, the confectionery mass particles granulometry is changed, thereby changing the solid phase specific surface area, so as to properly distribute the fat contents, to recover the confectionery material mass consistency to the desired values.

In order to define said desired gap or distance between the laminating cylinders, the measured distance of said cylinders is changed in subsequent increments or decrements of a preset value to provide a spreading-apart force of said cylinders equal to the reference spreading-apart force value.

For adjusting the position of the first swinging cylinder with respect to the second fixedly supported cylinder, the distance between the laminating cylinders is measured, said measured distance is compared with the desired distance, and a variation of the distance constituting the reference for adjusting the mutual locating movement of said cylinder is defined.

For continuously monitoring the confectionery material predefining process, the amount of the spreading-apart force measured by the cylinders together with the value of the cylinder measured distance is displayed.

The confectionery material pre-milling device for carrying out the method according to the present invention comprises a first swinging cylinder which can controllably swing with respect to a second cylinder supported at a fixed position and being characterized in that between the first and second cylinders a controllable adjusting device for feedback adjusting the position of the first cylinder with respect to the second cylinder is provided, that between the first cylinder and second cylinder a spreading-apart force transducer is provided, that said spreading-apart force transducer is operatively coupled to a driving and control device and that said driving and control device is operatively coupled to said feedback adjustment device for adjusting the mutual positions of said cylinders.

For automatically driving and controlling said feedback adjusting device for adjusting the mutual positions of said cylinders, said driving and controlling device is provided with an input operatively coupled to a comparing unit for comparing the load between said cylinders, to which a reference spreading-apart force preset signal device is operatively coupled, said comparing unit being operatively coupled to a microprocessor, in turn operatively coupled, at the outlet thereof, to a second cylinder distance comparing unit, said second comparing unit being operatively coupled to an adjusting device.

In order to precisely drive the first cylinder, the controlled feedback adjustment device for controlling the mutual positions of said cylinders is provided with a drive operatively coupled to a motor reducing unit, the casing of said motor reducing unit being articulately coupled to an extension of the support of the second cylinder, said motor reducing unit being operatively coupled to a screw shaft, said screw shaft being engaged with a scroll which is coupled to an articulation provided on an extension of the first cylinder support.

For measuring the load or spreading-apart force between said two cylinders, between the scroll and the first cylinder support extension articulation a load cell is provided.

For measuring the position of the first swinging cylinder, an encoder is keyed at the free end portion of the screw shaft.

For allowing the signals corresponding to the measured parameters or amounts to be displayed, the inlets of the drive and control device are operatively coupled to a display.

For precisely driving the scroll under a loaded condition, while reducing the jumping effect due to a friction with said screw shaft, said motor reducing unit is operatively coupled to a ball circulation screw.

For damping possible impacts due to the confectionery material being laminated between said cylinders, between said scroll and spreading-apart force transducer a resilient device is arranged.

For adjusting the stiffness of the resilient device, between said scroll and spreading-apart force transducer, a hydraulic cylinder-piston assembly is moreover provided.

In a modified embodiment of the invention, for preventing said cylinders from being damaged by lamination impacts, between the controllable feedback adjustment device and said first cylinder support, an overload device including a pin designed for a preset breaking load is arranged.

BRIEF DESCRIPTION OF THE DRAWINGS

The subject matter of the present invention will be disclosed in a more detailed manner hereinafter, with reference to an exemplary embodiment thereof shown in the accompanying drawings, where.

DESCRIPTION OF THE PREFERRED EMBODIMENT

Since the pre-milling device or machine for pre-milling a confectionery material has a known construction and operation, only the novel parts thereof, essential for understanding the invention, will be hereinafter disclosed.

Figure 1:
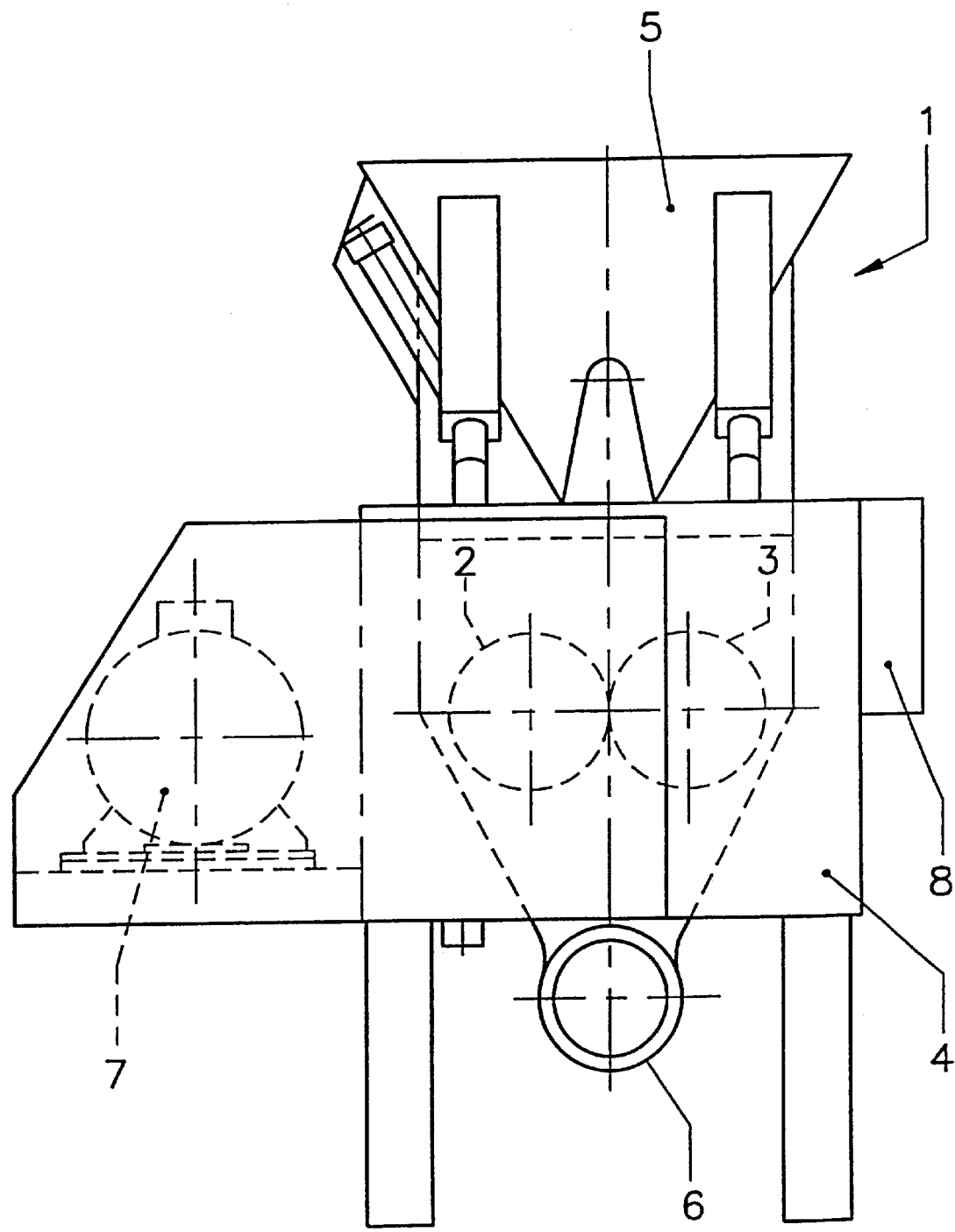
FIG. 1 is a side view illustrating a pre-refining machine or device.

FIG. 1 shows a confectionery material pre-milling device or pre-refining machine, generally indicated by 1.

The pre-refining machine 1 comprises laminating cylinders 2, 3 which are supported by a box-like supporting frame 4.

On the top of the laminating cylinders 2, 3 a conveying device 5 for conveying or feeding said confectionery material is provided.

Under said laminating cylinders 2, 3 a device 6 for outfeeding and conveying the pre-refined material to further downstream arranged and refining stations (not shown) is provided.

A drive 7 for rotatively driving said cylinders 2, 3 is operatively coupled to said laminating cylinders 2, 3.

The different parts 2, 3, 5, 6, 7 of the pre-refining machine 1 are operatively coupled to a drive and control device 8 arranged, for example, on a side of the framework 4 of the pre-refining machine 1.

Figure 2:
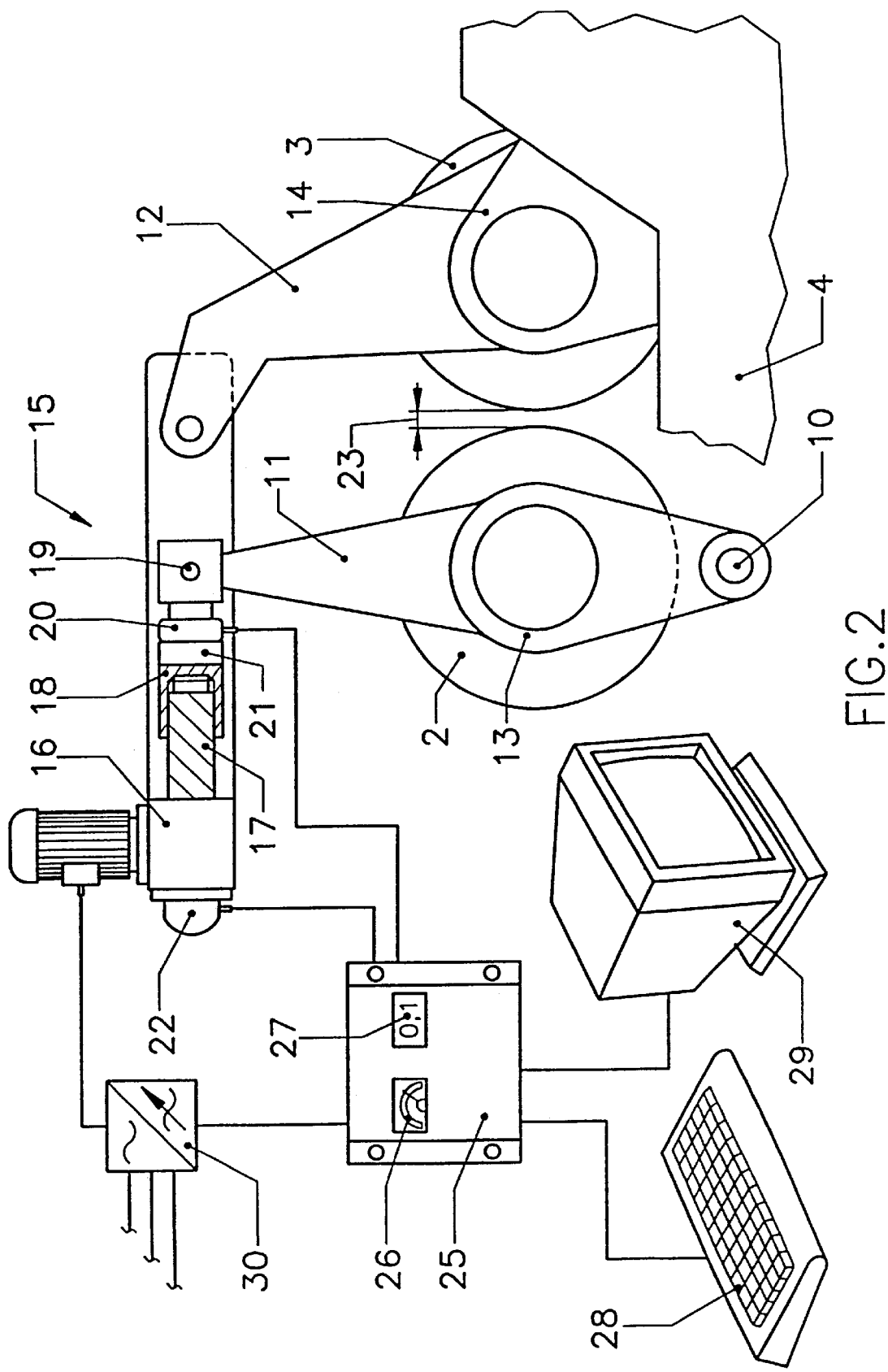
FIG. 2 is schematic partially cross sectioned view illustrating a detail of the laminating cylinders and of the automatic milling adjusting devices.

FIG. 2 shown that the first laminating cylinder 2 is swingably supported on a pivot pin 10 by the box-like framework 4 of the pre-refining machine 1.

The second laminating cylinder 3 is fixedly supported on said box-like framework 4 of the pre-refining machine 1.

By levers 11, 12, rigid with the supports 13, 14, said laminating cylinders 2, 3 are operatively coupled to a controllable feedback adjusting device for adjusting the position of the first swinging cylinder 2 with respect to the second fixed cylinder 3, as generally indicated by the reference number 15.

FIG. 2 shows only one of the controllable feedback adjusting devices 15 for adjusting the position of the cylinder 2.

Preferably, said controllable feedback adjusting devices 15 for adjusting the position of the first cylinder 2 are provided in a number of two, and operate on both the supports 13 provided at the end portions of the first cylinder 2.

The controllable feedback adjusting device 15 for adjusting the position of the first cylinder 2 is provided with a motor reducing unit 16 the casing whereof is rigid with the lever 12 extending from the support 14 of the second cylinder 3.

The motor reducing unit 16 is preferably operatively coupled to a screw shaft 17, such as a ball recirculating screw. The shaft 17 controls the displacement of a scroll 18 which is operatively coupled to the lever 11 extending from the support 13 of the first cylinder 2.

Advantageously, said scroll 18 is articulatedly coupled by an articulation 19 to said lever 11.

Between the articulation 19 and the scroll 11 is arranged a spreading-apart force transducer or sensor 20.

Preferably, between said articulation 19 and scroll 18 a load cell is arranged.

Between the spreading-apart force transducer 20 and scroll 18 a resilient device 21 for absorbing possible impacts occurring between the two laminating cylinders 2, 3 as the confectionery material (not shown) passes therethrough is provided.

Preferably, said resilient device 21 comprises a hydraulic cylinder-piston assembly, the feeding pressure whereof is suitably controlled.

In a modified embodiment of the invention, between the spreading-apart force transducer 20 and the scroll 18, an overload device including a load pin designed for a preset breaking load is arranged.

Said ball recirculating screw 17 has one end thereof rigid with a position transducer or sensor 22.

For example, to one end of said ball recirculating screw 17, an encoder is keyed.

Said encoder would detect the ball recirculating screw 17 revolution, and would consequently provide a signal proportional to the mutual position of said scroll 18 which, in turn, would be proportional to the position of the first laminating cylinder 2.

The position of the first laminating cylinder 2 with respect to the second fixed cylinder 3 will define the size or width 23 of the milling gap or nip.

The spreading-apart force transducers 20 and the position transducers 22 are operatively coupled to the inlets of a drive and control device 25.

The drive and control device 25 is provided for conditioning and converting the signals coming from the spreading-apart and position transducers 20 and 22 respectively, for a subsequent processing (for example a digital type of processing).

Preferably, the drive and control device is provided with displays 26, 27 for digitally displaying the signals coming from the transducers 20, 22.

Advantageously, said drive and control device 25 is operatively coupled to a keyboard 28 and a video monitor 29 in order to display the operation status of the devices and for monitoring the pre-refining machine 1, setting the desired data and programming the drive and control device 25.

The output of said drive and control device 25 is operatively coupled to a drive unit 30.

The drive unit 30 is operatively coupled to the motor reducing unit 16.

Figure 3:
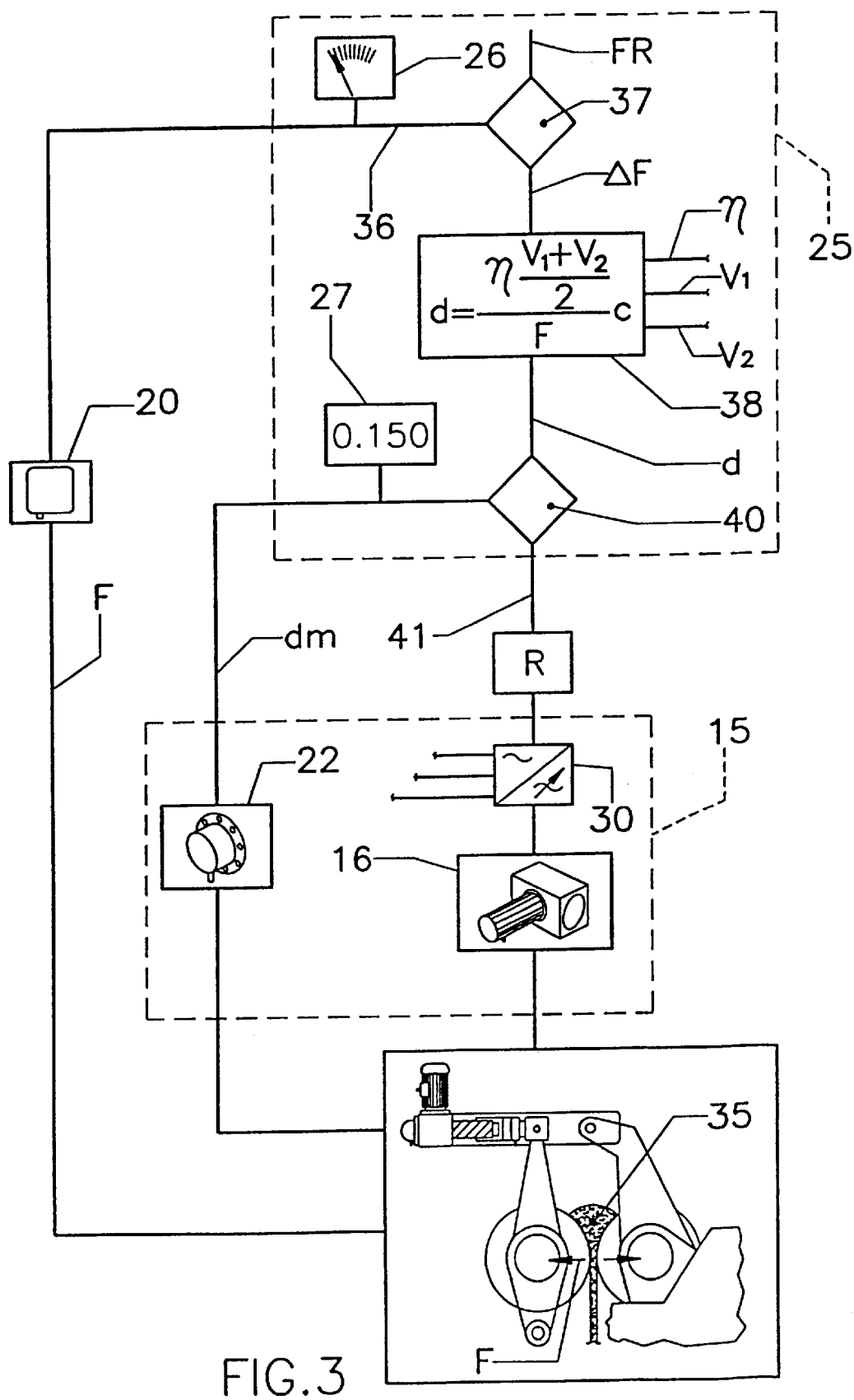
FIG. 3 is a block diagram illustrating different steps of the method according to the invention.

With reference to FIG. 3, the method according to the invention and the operation of the pre-milling device will be hereinafter disclosed.

Because of the passage of the confectionery material 35 through the milling gap or nip defined between the laminating cylinders 2, 3, a spreading-apart or repulsion force F will be generated between said cylinders 2, 3.

Said spreading-apart force F, urging the swinging cylinder 2, will be detected by the spreading-apart force transducer or sensor 20, providing a corresponding signal 36.

This signal 36, proportional to the spreading-apart force F, is sent to the drive and control device 25, to be conditioned and converted, for example, to a digital signal.

Advantageously, for allowing the pre-refining machine operators to control a proper operation of the device, the signal 36 proportional to the spreading-apart force F is sent to a display 26.

The spreading-apart force F proportional signal 36 is compared at 37 with a signal FR proportional to a reference spreading-apart force value, as desired between the laminating cylinders 2, 3.

From the comparing step 37, a signal proportional to the spreading-apart force variation ΔF will be defined and sent to a calculating micro-processor 38, provided for defining the confectionery material pre-refining process parameters as it will be disclosed in a more detailed manner hereinafter.

The confectionery material refining process or method provides to use a strict relationship between the mechanical parameters of the refining device and the confectionery material mass consistency.

In particular:

$$d = \frac{\eta \frac{V1 + V2}{2}}{F} C$$

where (d) is the distance or milling gap or nip of the cylinders 2, 3, (V) the peripheral speed of the cylinders 2, 3 involved in the pre-refining step, ($\bar{m}$) the consistency or viscosity of the confectionery material mass, (F) the load of the laminating cylinders 2, 3, and (C) a proportionality constant.

In an embodiment of the invention, the calculating microprocessor 38 defines, based on the spread-apart force variation ΔF, a laminating cylinder 2, 3 distance variation, by either adding or subtracting a pre-set value of the actual lamination cylinder distance.

The step by step variation of preset values is continuously performed up to found a lamination cylinder spread-apart force value equal to the reference spread-apart force value FR.

In a modified embodiment of the invention, by supplying the calculating microprocessor 38 with signals proportional to the confectionery material consistency $\bar{m}$, to the speed V1 of the first cylinder 2, to the speed V2 of the second cylinder 3 (the cylinder 2, 3 speeds V1, V2 being preset values), the desired distance (d) of the cylinders 2, 3 allowing to obtain the desired consistency ($\bar{m}$) of the confectionery material will be set.

Simultaneously, by the position transducer 22, the actual distance of the second swinging cylinder 2 and second fixed cylinder 3 is measured.

The position transducer 22 provides a signal (dm) which is proportional to the cylinder 2, 3 measured distance, which signal is supplied to the drive and control device 25 to be conditioned therein and converted, for example, to a digital signal.

Advantageously, for allowing the method to be monitored, said signal (dm) is sent to a display 27 and compared at 40 with said cylinder 2, 3 desired or target distance (d), thereby providing a reference signal 41 to the feedback adjustment controllable devices 15 for adjusting the position of said first swinging cylinder 2, said reference signal 41 being further supplied to an adjuster (r) controlling the driving unit of said motor reducing unit 16, which, in turn, will drive the first swinging cylinder 2 to bring it to the target distance from the second fixed cylinder 3.

What is claimed is:

1. A method of pre-milling particulate confectionery material, comprising the steps of:
   a) feeding the confectionery material through a nip between two rotary milling cylinders having an adjustable position relative to each other, the nip having a variable spacing as the confectionery material passes through the nip and exerts a force on the cylinders;
   b) measuring the force on the cylinders to obtain a measured force;
   c) comparing the measured force to a reference force to obtain a force differential;
   d) defining a desired spacing for the nip based on the force differential; and
   e) adjusting the position of the cylinders based on the desired spacing to pre-mill the confectionery material at the desired spacing for the nip and obtain a desired consistency for the confectionery material.

2. The method of claim 1, wherein the adjusting step is performed by pivoting one of the cylinders relative to the other of the cylinders.

3. The method of claim 1, wherein the force measuring step is performed by a transducer for converting the force to an electrical force signal.

4. The method of claim 3, wherein the defining step includes determining the desired spacing based on rotary speeds of the cylinders and the consistency of the confectionery material.

5. The method of claim 1; and further comprising the steps of measuring the spacing of the nip to obtain a measured nip spacing; and comparing the measured nip spacing to the desired spacing to obtain a spacing differential; and wherein the adjusting step is performed by adjusting the position of the cylinders based on the spacing differential.

6. The method of claim 5, wherein the spacing measuring step is performed by a transducer for converting the relative position of the cylinders to an electrical signal.

7. The method of claim 5; and further comprising the step of displaying the measured nip spacing.

8. The method of claim 1; and further comprising the step of displaying the measured force.

9. An arrangement for pre-milling particulate confectionery material, comprising:
   a) two rotary milling cylinders having a nip therebetween and an adjustable position relative to each other;
   b) a feed conveyor for feeding the confectionery material through the nip, the nip having a variable spacing as the confectionery material passes through the nip and exerts a force on the cylinders;
   c) a force transducer for measuring the force on the cylinders to obtain a measured force;
   d) a first comparator for comparing the measured force to a reference force to obtain a force differential;
   e) a processor for defining a desired spacing for the nip based on the force differential; and
   f) a drive for adjusting the position of the cylinders based on the desired spacing to pre-mill the confectionery material at the desired spacing for the nip and obtain a desired consistency for the confectionery material.

10. The arrangement of claim 9; and further comprising a frame, and wherein one of the cylinders is mounted for movement relative to the frame, and wherein the other of the cylinders is fixed relative to the frame.

11. The arrangement of claim 10, wherein said one cylinder is pivotably mounted on the frame.

12. The arrangement of claim 9, wherein the force transducer is a converter that converts the force to an electrical signal.

13. The arrangement of claim 9, wherein the processor has a first input for receiving a first signal corresponding to the force differential, a second input for receiving a second signal corresponding to the speed of one of the cylinders, a third input for receiving a third signal corresponding to the speed of the other of the cylinders, and a fourth input for receiving a fourth signal corresponding to the consistency of the confectionery material.

14. The arrangement of claim 9; and further comprising a position transducer for measuring the spacing of the nip to obtain a measured nip spacing; and a second comparator for comparing the measured nip spacing to the desired nip spacing to obtain a spacing differential; and wherein the drive is operative for adjusting the position of the cylinders based on the spacing differential.

15. The arrangement of claim 14; and further comprising a display for displaying the measured nip spacing.

16. The arrangement of claim 14, wherein the drive includes a motor reducing unit having a stationary casing coupled to a fixed one of the cylinders, and a drive shaft threaded to a scrolling element coupled to a movable one of the cylinders.

17. The arrangement of claim 16, wherein the force transducer is a load cell connected between the scrolling element and the movable cylinder.

18. The arrangement of claim 16, wherein the position transducer is located at an end region of the drive shaft.

19. The arrangement of claim 17; and further comprising a shock absorber connected between the scrolling element and the load cell.

20. The arrangement of claim 9, and further comprising a display for displaying the measured force.

* * * * *